(12) United States Patent
Fujimoto et al.

(10) Patent No.: US 11,010,633 B2
(45) Date of Patent: May 18, 2021

(54) IMAGE PROCESSING METHOD AND SHADING REFERENCE DATA GENERATION METHOD

(71) Applicant: SCREEN HOLDINGS CO., LTD., Kyoto (JP)

(72) Inventors: Hiroki Fujimoto, Kyoto (JP); Kazutaka Taniguchi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 300 days.

(21) Appl. No.: 15/769,719

(22) PCT Filed: Oct. 13, 2016

(86) PCT No.: PCT/JP2016/080360
§ 371 (c)(1),
(2) Date: Apr. 19, 2018

(87) PCT Pub. No.: WO2017/069035
PCT Pub. Date: Apr. 27, 2017

(65) Prior Publication Data
US 2018/0307938 A1 Oct. 25, 2018

(30) Foreign Application Priority Data

Oct. 22, 2015 (JP) .............. JP2015-207691

(51) Int. Cl.
*G06K 9/40* (2006.01)
*G06K 9/62* (2006.01)
(Continued)

(52) U.S. Cl.
CPC ......... *G06K 9/6202* (2013.01); *G02B 21/008* (2013.01); *G02B 21/082* (2013.01);
(Continued)

(58) Field of Classification Search
CPC ............. G06K 9/00127; G06K 9/0014; G06K 9/2027; G06K 9/36; G06K 9/38;
(Continued)

(56) References Cited

U.S. PATENT DOCUMENTS

| 6,670,988 B1 * | 12/2003 | Gallagher | .............. H04N 1/401 348/224.1 |
| 2003/0035579 A1 * | 2/2003 | Yang | ........................ G06T 7/11 382/169 |

(Continued)

FOREIGN PATENT DOCUMENTS

| JP | 2004-317190 A | 11/2004 |
| JP | 2005-072967 A | 3/2005 |
| JP | 2013-236249 A | 11/2013 |

OTHER PUBLICATIONS

Sean Larkin, Alessandro Invernizzi, David Beecher, Giovanni Staurenghi, Tim Holmes, "Perfusion measures for dynamic ICG scanning laser ophthalmoscopy", Proc. SPIE 7550, Opthalmic Technologies XX, 75500H, Mar. 2010, pp. 1-11 (Year: 2010).*

(Continued)

*Primary Examiner* — Eric Rush
(74) *Attorney, Agent, or Firm* — McDermott Will & Emery LLP

(57) ABSTRACT

A technology capable of effectively and stably correcting brightness unevenness in an image obtained by imaging is provided. An image processing method includes an image obtaining step of obtaining an original image obtained by imaging an imaging object together with a substantially uniform background, an approximation step of specifying an approximation formula for approximating a two-dimensional luminance profile of the original image to a probability density function of a two-dimensional normal distribution, and a correction step of correcting a luminance value of each pixel constituting the original image on the basis of (Continued)

a luminance value of the two-dimensional luminance profile expressed by the approximation formula.

3 Claims, 8 Drawing Sheets

(51) Int. Cl.
| | |
|---|---|
| *H04N 5/225* | (2006.01) |
| *G02B 21/36* | (2006.01) |
| *H04N 5/243* | (2006.01) |
| *H04N 1/401* | (2006.01) |
| *G06T 5/00* | (2006.01) |
| *H04N 1/407* | (2006.01) |
| *G06K 9/00* | (2006.01) |
| *H04N 5/235* | (2006.01) |
| *G02B 21/00* | (2006.01) |
| *G02B 21/08* | (2006.01) |
| *G06K 9/20* | (2006.01) |

(52) U.S. Cl.
CPC ........... *G02B 21/36* (2013.01); *G02B 21/367* (2013.01); *G06K 9/0014* (2013.01); *G06K 9/00127* (2013.01); *G06K 9/2027* (2013.01); *G06T 5/008* (2013.01); *G06T 5/009* (2013.01); *H04N 1/401* (2013.01); *H04N 1/4072* (2013.01); *H04N 5/225* (2013.01); *H04N 5/235* (2013.01); *H04N 5/243* (2013.01); *G06T 2207/10056* (2013.01); *G06T 2207/30024* (2013.01); *G06T 2207/30072* (2013.01)

(58) Field of Classification Search
CPC ...... G06K 9/40; G06K 9/4642; G06K 9/4647; G06K 9/4661; G06K 9/6202; G06T 5/00; G06T 5/001; G06T 5/007; G06T 5/008; G06T 5/009; G06T 5/40; G06T 2207/10056; G06T 2207/30024; G06T 2207/30072; G02B 21/008; G02B 21/082; G02B 21/36; G02B 21/365; G02B 21/367; H04N 1/401; H04N 1/407; H04N 1/4072; H04N 1/4074; H04N 5/225; H04N 5/23229; H04N 5/235; H04N 5/2351; H04N 5/243
USPC ....... 382/100, 168, 169, 172, 254, 270–276, 382/282; 345/426, 428, 589, 590, 690; 348/241, 251, 254, 255, 671, 672, 674; 358/448, 461, 464, 518–522
See application file for complete search history.

(56) References Cited

U.S. PATENT DOCUMENTS

| | | | |
|---|---|---|---|
| 2005/0046905 A1* | 3/2005 | Aizaki | H04N 1/401 358/296 |
| 2007/0019861 A1* | 1/2007 | Zwanger | G06T 7/0002 382/171 |
| 2010/0135594 A1* | 6/2010 | Allebach | G06T 5/003 382/275 |
| 2012/0224783 A1* | 9/2012 | Chen | G06K 9/36 382/260 |
| 2012/0313012 A1* | 12/2012 | Selvin | G06T 3/4069 250/459.1 |
| 2013/0027553 A1* | 1/2013 | Silny | G01J 1/08 348/144 |
| 2013/0076897 A1* | 3/2013 | Ogi | G02B 21/365 348/143 |
| 2015/0070531 A1* | 3/2015 | Ikefuji | G06T 5/009 348/234 |
| 2015/0161773 A1 | 6/2015 | Takahashi et al. | |

OTHER PUBLICATIONS

Extended European Search Report issued in corresponding European Patent Application No. 16857350.9, dated Apr. 12, 2019.
Sean Larkin et at, "Perfusion measures for dynamic ICG scanning laser ophthalmoscopy", Proc. of SPIE vol. 7550, 75500H.
Search Report issued in corresponding International Patent Application No. PCT/JP2016/080360, dated Jan. 10, 2017.

\* cited by examiner

F I G. 1
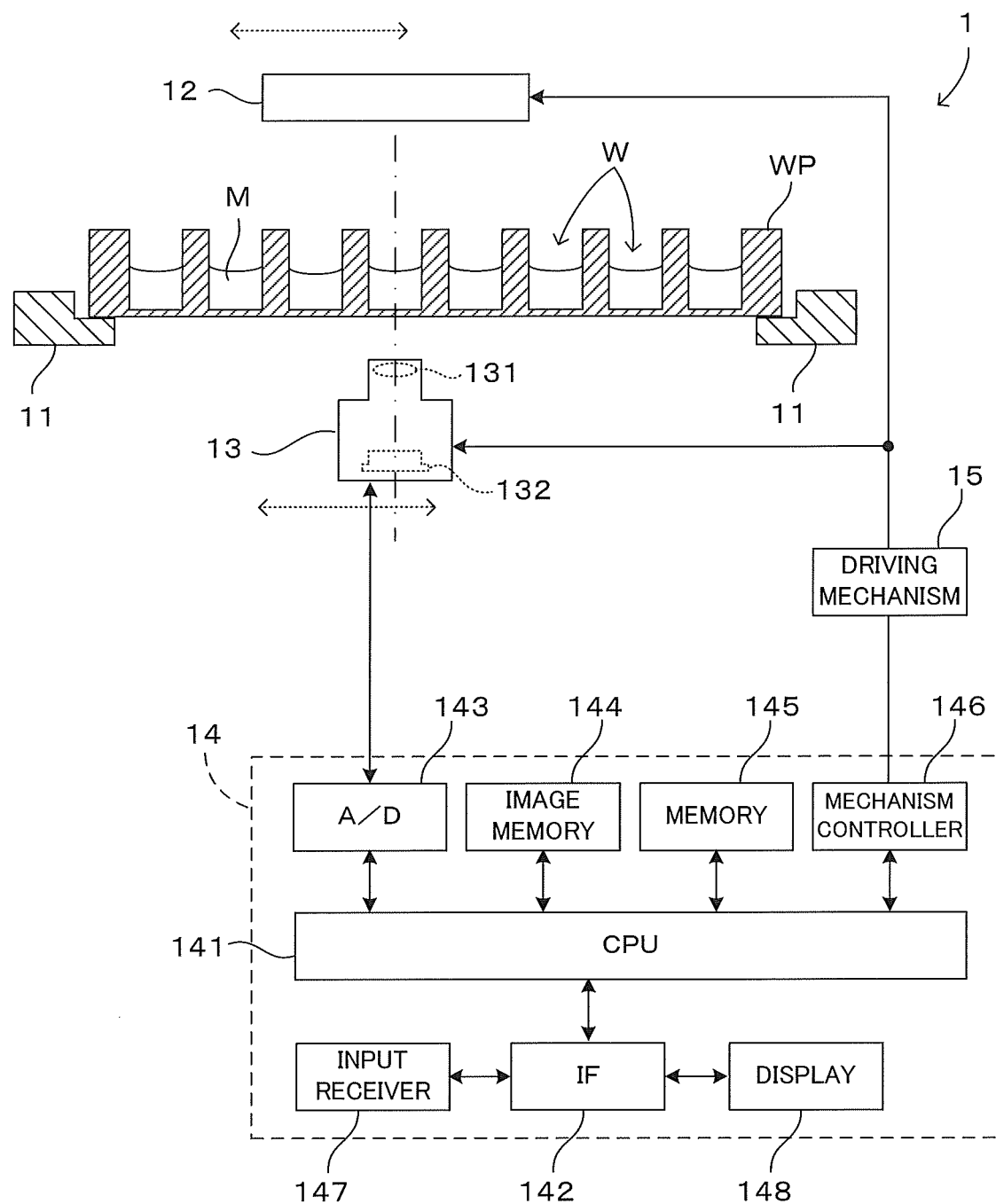

FIG. 6A
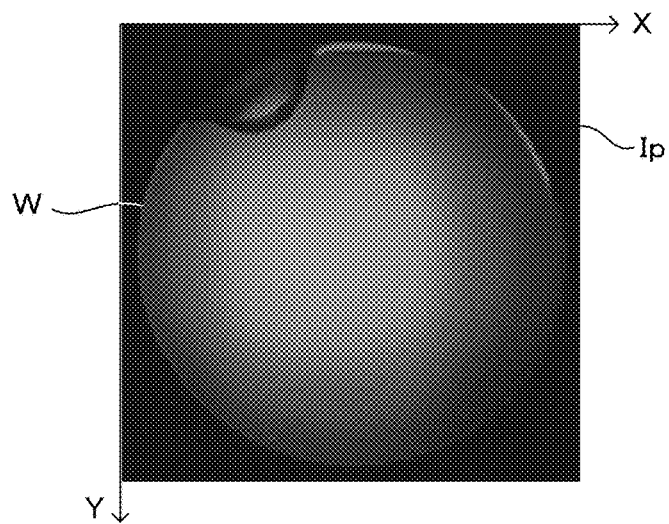
FIG. 6B
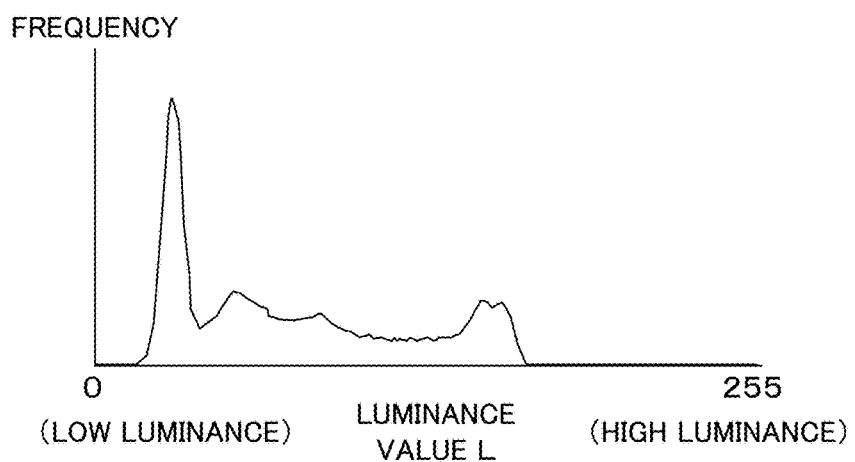
FIG. 6C
| PIXEL NUMBER | 453829 |
| --- | --- |
| AVERAGE LUMINANCE VALUE | 73.7 |
| STANDARD DISTRIBUTION OF LUMINANCE | 44.29 |
| MINIMUM VALUE | 9 |
| MAXIMUM VALUE | 167 |
| MODE | 29 |

| UPPER LEFT VERTEX COORDINATE | (76, 104) |
|---|---|
| UPPER RIGHT VERTEX COORDINATE | (526, 104) |
| LOWER LEFT VERTEX COORDINATE | (76, 566) |
| LOWER RIGHT VERTEX COORDINATE | (526, 566) |
| WIDTH | 450 |
| HEIGHT | 462 |

IMAGE PROCESSING METHOD AND SHADING REFERENCE DATA GENERATION METHOD

CROSS REFERENCE

This application is the U.S. National Phase under 35 US.C. § 371 of International Application No. PCT/JP2016/080360, filed on Oct. 13, 2016, which claims the benefit of Japanese Application No. 2015-207691, filed on Oct. 22, 2015, the entire contents of each are hereby incorporated by reference.

TECHNICAL FIELD

This invention relates to a technology for solving brightness unevenness by correcting an image obtained by imaging.

BACKGROUND

In a technology for imaging an imaging object under illumination, brightness unevenness may appear in an image due to properties of an illumination system or an imaging system. Even if a background of an imaging object has a substantially uniform optical density, such brightness unevenness possibly occurs, for example, due to light quantity unevenness or the like of illumination light incident on the imaging object. A shading correction technology is known as a technology for correcting such brightness unevenness. For example, in a technology described in patent literature 1, shading correction data generated on the basis of shading properties of an image imaged without a specimen is applied to each pixel of an image obtained by imaging the specimen (imaging object) using a microscope. In this way, image density unevenness due to an optical system is solved.

CITATION LIST

Patent Literature

[Patent literature 1] JP 2005-072967A

SUMMARY

Technical Problem

For example, in the case of imaging an imaging object in a liquid, illumination light is incident on the imaging object via a liquid surface, but a state of the liquid surface is not necessarily constant. As in this example, incident conditions of illumination light may be different for each imaging object. In such a case, the shading properties obtained beforehand are not necessarily suitable and an effective correction may not be possible.

Concerning this problem, in the conventional technology described above, an operator can adjust correction properties while confirming an image after correction displayed on a monitor. However, expert knowledge is necessary to efficiently perform an adjusting operation and a correction result depends on the operator's subjectivity. Thus, there is a problem in the stability of the correction result.

Solution to Problem

This invention was developed in view of the above problem and aims to provide a technology capable of effectively and stably correcting brightness unevenness in an image obtained by imaging.

To achieve the above object, an aspect of the present invention is an image processing method which includes: an image obtaining step of obtaining an original image obtained by imaging an imaging object together with a substantially uniform background; an approximation step of specifying an approximation formula for approximating a two-dimensional luminance profile of the original image to a probability density function of a two-dimensional normal distribution; and a correction step of correcting a luminance value of each pixel constituting the original image on the basis of a luminance value of the two-dimensional luminance profile expressed by the approximation formula.

Another aspect of the present invention is a shading reference data generation method for generating shading reference data serving as a reference when a shading correction is performed on an original image obtained by imaging an imaging object together with a substantially uniform background. To achieve the above object, the shading reference data generation method includes: an image obtaining step of obtaining the original image; an approximation step of specifying an approximation formula for approximating a two-dimensional luminance profile of the original image to a probability density function of a two-dimensional normal distribution; and a setting step of setting data corresponding to a virtual image having the two-dimensional luminance profile expressed by the approximation formula as the shading reference data.

In the invention thus configured, the approximation formula of the probability density function expressing the two-dimensional normal distribution is specified on the basis of the two-dimensional luminance profile of the original image under the assumption that a luminance profile of a background part of the imaging object follows the two-dimensional normal distribution. The two-dimensional luminance profile expressed by this approximation formula has a meaning as a mathematical model approximately expressing shading properties. According to the knowledge of the inventors of this application, such approximation is effective in many imaging situations where a background is substantially uniform, for example, in the imaging of an imaging object in a liquid. Specifically, a correction similar to that of the shading correction technology is performed using the luminance profile expressed by the approximation formula obtained as described above in the invention instead of a profile corresponding to shading properties of an optical system obtained by imaging beforehand in the conventional technology. In this way, brightness unevenness in the original image can be solved and an image having uniformized brightness can be obtained. Since a process does not depend on an operator's subjective judgment, a stable result can be obtained.

Advantageous Effects of Invention

As described above, according to the image processing method of the invention, brightness unevenness in an image obtained by imaging can be effectively and stably corrected. Further, according to the shading reference data generation method of the invention, shading reference data suitable for correcting brightness unevenness in an image can be generated.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF DRAWINGS

FIG. 1 is a diagram showing a schematic configuration of an imaging apparatus to which an imaging method according to the invention can be applied.

FIGS. 6A to 6C are diagrams showing a method for obtaining initial values of the recurrence formula from the process target image.

DESCRIPTION OF EMBODIMENTS

Figure 2:
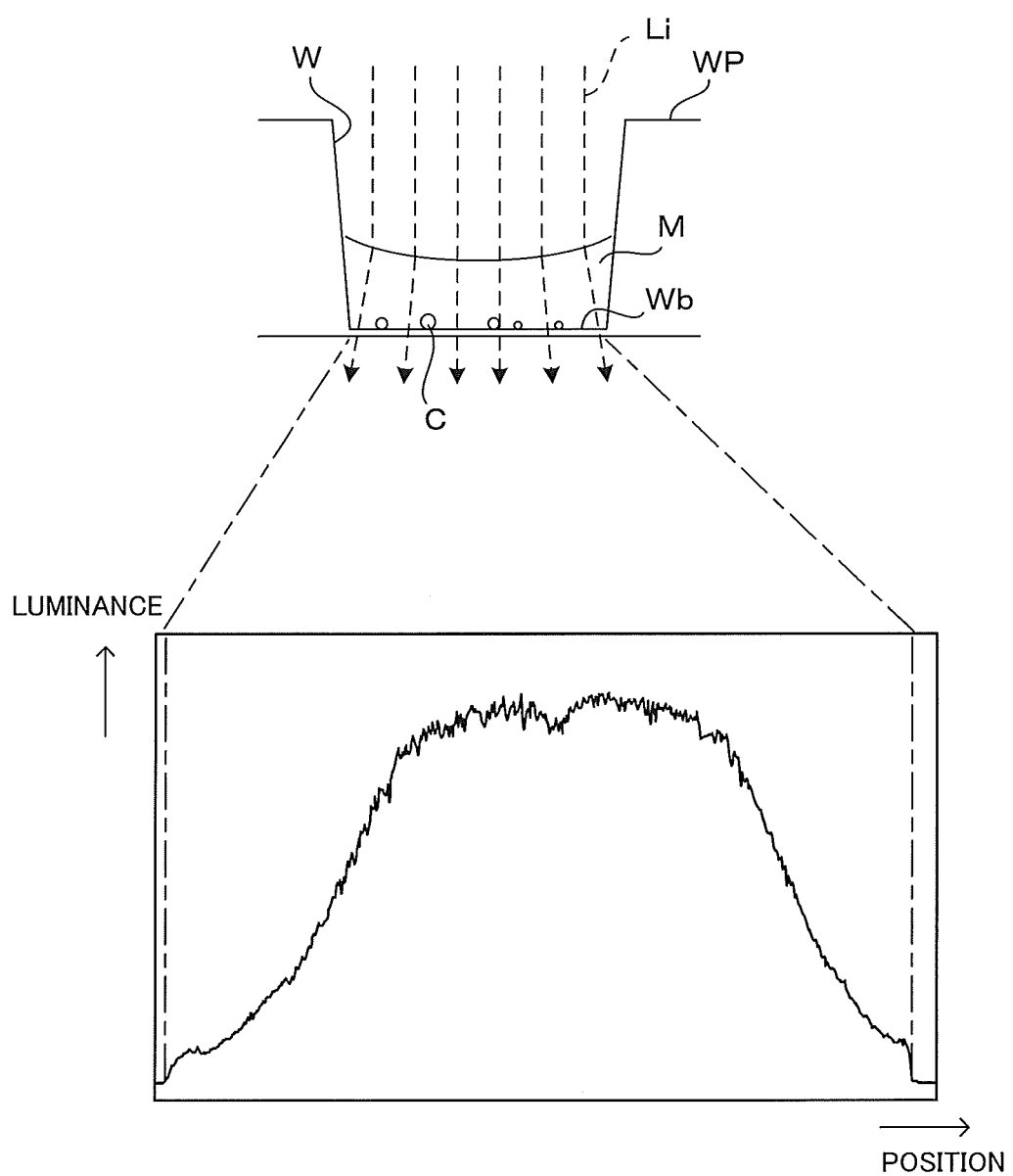
FIG. 2 is a diagram showing an example of a luminance profile of a well image.

FIG. 1 is a diagram showing a schematic configuration of an imaging apparatus to which an imaging method according to the invention can be applied. This imaging apparatus 1 is an apparatus for imaging a cell, cell colony, microbe or the like (hereinafter, called generically "cell or the like") cultured in liquid poured into recesses called wells W formed on the upper surface of a well plate WP.

The well plate WP is generally used in the fields of drug discovery and bioscience. A plurality of wells W having a substantially circular cross-section and a transparent and flat bottom surface are disposed to the upper surface of a plate having a flat plate shape. The number of the wells W on the well plate WP is arbitrary. For example, a well plate WP having 96 (12×8 matrix array) wells can be used. A diameter and a depth of each well W are typically about several mm. Note that the size of a well plate and the number of wells used in this imaging apparatus 1 are arbitrary without being limited to these. For example, well plate having 6 through 384 wells may be used. Further, the imaging apparatus 1 can be applied to image the cell or the like not only in the well plate provided with a multitude of wells but also, in a flat container called a "dish", for example.

A predetermined amount of liquid as a culture medium M is poured into each well of the well plate WP. Cells or the like cultured under predetermined culture conditions in this liquid are imaging objects of this imaging apparatus 1. The culture medium M may be added with appropriate reagents or may be gelled after being poured into the wells W in a liquid state. In this imaging apparatus 1, for example, a cell or the like cultured on an inner bottom surface of the well can be an imaging object as described later. About 50 to 200 microliters of the liquid is generally usually used.

The imaging apparatus 1 includes a holder 11 which holds the well plate WP, an illuminator 12 arranged above the holder 11, an imager 13 arranged below the holder 11 and a controller 14 which includes a CPU 141 controlling the operation of these components. The holder 11 holds the well plate WP in a substantially horizontal posture by being held in contact with a peripheral edge part of the lower surface of the well plate WP carrying sample together with liquid in each well W.

The illuminator 12 emits an illumination light toward the well plate WP held by the holder 11. For example, a white LED (light emitting diode) may be used as a light source of the illumination light. A combination of the light source and an appropriate illumination optical system are used as the illuminator 12. The cells or the like in the well W disposed to the well plate WP are illuminated by the illuminator 12 from above.

The imager 13 is provided below the well plate WP held by the holder 11. In the imager 13, an imaging optical system is arranged at a position right below the well plate WP. An optical axis of the imaging optical system extends in a vertical direction. FIG. 1 shows a side view. A right and left direction of the figure indicates a horizontal direction and an up and down direction of the figure indicates a vertical direction.

The imaging of the cell or the like in the well W is performed by the imager 13. Specifically, light emitted from the illuminator 12 and incident on the surface of the liquid from above the well W illuminates the imaging object. Light transmitted downward from the bottom surface of the well W is incident to a light receiving surface of an imaging element 132 via the imaging optical system including an objective lens 131. An image of the imaging object is formed on the light receiving surface of the imaging element 132 by the imaging optical system is imaged by the imaging element 132. The imaging element 132 is a linear image sensor having a one-dimensional light receiving surface or an area image sensor having a two-dimensional light receiving surface. A CCD sensor or a CMOS sensor can be used as the imaging element 132.

The imager 13 is capable of moving in the horizontal direction and the vertical direction by a mechanism controller 146 provided in the controller 14. Specifically, the mechanism controller 146 moves the imager 13 in the horizontal direction by operating a drive mechanism 15 based on a control command from the CPU 141. By doing so, the imager 13 moves relative to the well W in the horizontal direction. Further, focusing is performed by moving the imager 13 in the vertical direction.

Further, the as indicated by arrows with dotted lines shown in FIG. 1, the driving mechanism 15 moves the illuminator 12 integrally with the imager 13 when the imager 13 is moved in the horizontal direction. Specifically, the illuminator 12 is arranged such that a center of emitted light substantially coincides with the optical axis of the imaging optical system. When the imager 13 moves in the horizontal direction, the illuminator 12 also moves in conjunction with the imager 13.

When an image of one well W in detail is required, the imaging is performed in a state that a whole of the well W is included in a field of view. In this time, the mechanism controller 146 positions the imager 13 in the horizontal direction such that the optical axis of the imaging optical system coincides with the center of the well W. By doing so, whichever well W is imaged, the center of the well W and the center of emitted light are always position on the optical axis of the imaging optical system. Consequently, the illuminating condition becomes constant regardless of which well W is to be imaged, wherefore imaging conditions can be maintained to be satisfactory.

On the other hand, when imaging is required to perform with a plurality of the wells W more quickly, the imaging is performed with moving the imager 13 horizontally. Specifically, the mechanism controller 146 realizes a scan movement by moving the illuminator 12 and the imager 13 integrally with constant speed in the horizontal direction. The imager 13 performs imaging periodically, thereby a wider area is imaged. Particularly, when the imaging device of the imager 13 is the one-dimensional image sensor, a two-dimensional image can be obtained by the scan movement of the imager 13 relative to the imaging object.

The image signal output from the imaging device of the imager 13 is send to the controller 14. Specifically, the image signal is input to an AD converter (A/D) 143 provided in the controller 14 and converted into digital image data. The CPU 141 performs appropriate image processings based on the received image data. The controller 14 further includes an image memory 144 for storing image data and a memory 145 for storing programs to be executed by the CPU 141 and data generated by the CPU 141, but these may be integrated. The CPU 141 performs variable calculation processings described later by executing a control program stored in the memory 145.

Besides, the controller 14 is provided with an interface (I/F) 142. The interface 142 has a function of performing data exchange with an external apparatus connected via a communication line besides a function of receiving an operation input from a user and presenting information such as processing results to the user. To realize the user interface function, an input receiver 147 for receiving an operation input from the user and a display 148 for displaying the messages to the user, a processing result or the like are connected to the interface 142.

Note that the controller 14 may be an exclusive device including above hardware or may be a general-purpose processing device such as a personal computer or a workstation installed with the control program for performing the process described above. Specifically, a general-purpose computer apparatus may be used as the controller 14 of the imaging apparatus 1. When a general-purpose processing device is used as the controller 14, the imaging apparatus 1 may have just a minimal control function for controlling each components of the imager 13.

FIG. 2 is a diagram showing an example of a luminance profile of a well image. As shown in an upper part of FIG. 2, a culture medium M is injected into a well W to be imaged, cells or the like C, which are imaging objects, are distributed inside the culture medium M, generally on an inner bottom surface Wb of the well W. The culture medium M is a liquid or a gel obtained by gelling an injected liquid, and the liquid surface thereof is not necessarily a horizontal surface and generally forms a meniscus concave upward.

Thus, illumination light Li incident on the liquid surface from above substantially propagates straight in a part near a center of the well W and transmits to a side below the well W via the well inner bottom surface Wb. In contrast, the illumination light Li is refracted at the liquid surface at a position near a side wall surface of the well W and a propagation direction thereof is changed to an outward direction from the center of the well W. As a result, in an imaged image, a relatively high luminance is obtained near the center of the well W, whereas the luminance decreases toward a peripheral edge part of the well W as shown in an example of a luminance profile in a lower part of FIG. 2. Besides, wiggling variations of the luminance due to the cells or the like C in the culture medium M, noise or the like possibly appear in the image.

The culture medium M itself is substantially homogenous and an optical density thereof is thought to be roughly uniform. Thus, an image density of the culture medium M serving as a background of the cells or the like C is also supposed to be inherently uniform. However, due to the aforementioned reason, brightness unevenness of, for example, being bright in a central part and dark in a peripheral edge part occurs in an actual image. Further, brightness unevenness possibly occurs also due to the inclination of an incident direction of illumination light.

A technology for correcting such brightness unevenness is a shading correction technology. However, the amount and surface state of the culture medium M are not necessarily constant such as due to variations when the liquid is injected, and an incident light quantity distribution of illumination light may differ for each well W. Due to these causes, it may not be suitable in some cases to apply a general shading correction technology. Specifically, a reference image obtained under illumination conditions serving as a reference is necessary in a conventional shading correction technology, but the reference cannot be uniquely determined in the above cases.

Accordingly, in this embodiment, data corresponding to a reference image is extracted to perform a correction from an original image, using an image obtained by imaging the well W containing the imaging objects as the original image. Specifically, assuming that brightness unevenness due to the surface state of the culture medium M and the illumination light quantity distribution has a luminance distribution according to a two-dimensional normal distribution, a probability density function approximately expressing this luminance distribution is specified. Then, the original image is corrected, using a virtual model image having a luminance distribution expressed by the obtained probability density function instead of the reference image. By doing so, an image having brightness unevenness in the original image solved is obtained.

Figure 3A:
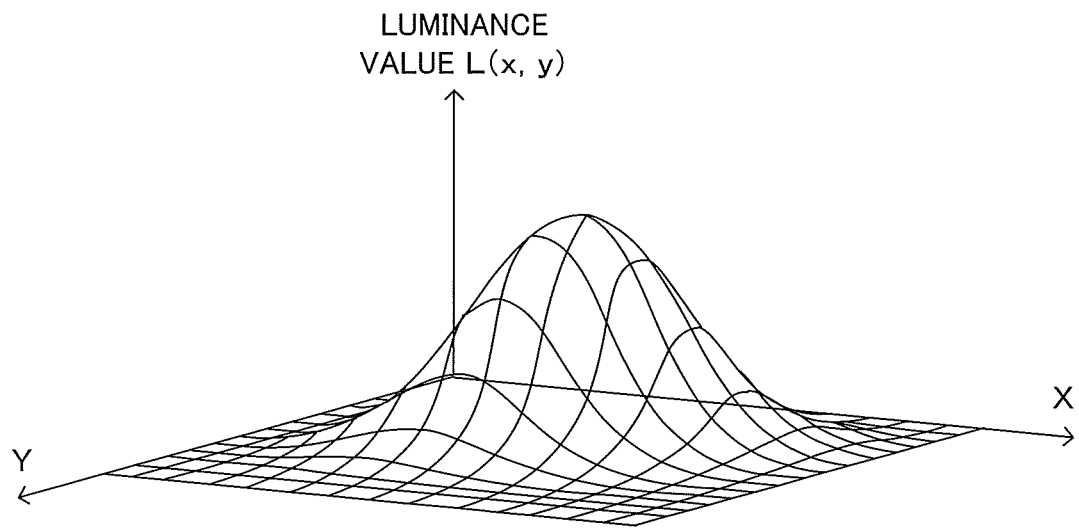
FIGS. 3A and 3B are graphs showing the probability density function of the two-dimensional normal distribution.
Figure 3B:
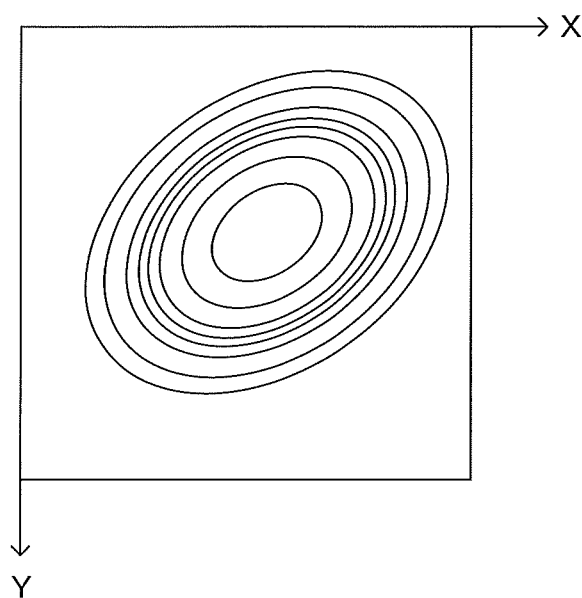

FIGS. 3A and 3B are graphs showing the probability density function of the two-dimensional normal distribution. More specifically, FIG. 3A is a graph showing a luminance profile according to the two-dimensional normal distribution as a three-dimensional map. FIG. 3B is a graph showing the luminance profile as a two-dimensional map by equi-luminance lines. It is assumed that a coordinate of the image in a horizontal direction is an X coordinate and a coordinate thereof in a vertical direction is a Y coordinate. At this time, a luminance value L(x, y) of a pixel P(x, y) having an X coordinate value of x and a Y coordinate value of y, out of each pixel constituting the image, can be expressed by the following (Equation 1), which is a probability density function corresponding to the two-dimensional normal distribution.

$$F(x,y;a,b,c,d,e,f,g) = a\exp\{-b(x-e)^2 + c(y-f)^2 + d(x-e)(y-f)\} + g \quad \text{(Equation 1)}$$

The luminance value L(x, y) can take various values depending on values of parameters a, b, c, d, e, f and g in the above (Equation 1), but the luminance profile on an arbitrary straight line in an XY plane is a normal distribution curve as is clear from graph shapes of FIGS. 3A and 3B. Further, an equi-luminance plane generally has an elliptical shape, and a major axis direction thereof can be any of various directions.

If (Equation 1) and a curved surface shown in FIG. 3A are compared, the parameter a corresponds to a luminance value at a peak of the curved surface, and the parameters b, c respectively correspond to spread shapes of the curved surface in X and Y directions. Further, the parameters e, f correspond to coordinate positions of the peak, and the parameter d represents the rotation of an ellipse main axis.

Further, the parameter g corresponds to a luminance value to which the base of the curved surface comes closer.

The least-squares method is widely used as a method for obtaining a mathematical expression approximately expressing a distribution of actual data. However, if approximate representation by a general linear high-order polynomial is allowed only for the purpose of simply minimizing an error, it may be possibly not suitable to express a luminance distribution in a well in some cases. More specifically, in a background part of the image obtained by imaging the inside of the well W, the luminance value is highest near the center of the well W and the luminance value converges to a fixed value in a peripheral end part. Unless the luminance values in the central part and the peripheral end part are reflected as constraint conditions in an approximation formula, an image after correction may become unnatural.

In this point, it is reasonable to use the probability density function of the two-dimensional normal distribution expressed by (Equation 1) as the approximation formula. Further, the inventors of this application evaluated a correction method in this embodiment using images obtained by imaging various specimens and confirmed that a good result was obtained in many cases.

By approximating brightness unevenness appearing in the original image due to imaging conditions to such a luminance profile and performing a correction process to remove a contribution of this luminance profile from the original image, it is possible to obtain an image having an optical density inherently possessed by the imaging object reflected therein. Such a correction process corresponds to a shading correction process based on the reference image obtained beforehand in the conventional technology. More specifically, this correction process is a correction process using a model image generated on the basis of the original image instead of the reference image used in the shading correction process of the conventional technology. The correction process of this embodiment is referred to as a "shading correction process" in this embodiment for the sake of convenience below.

Figure 4:
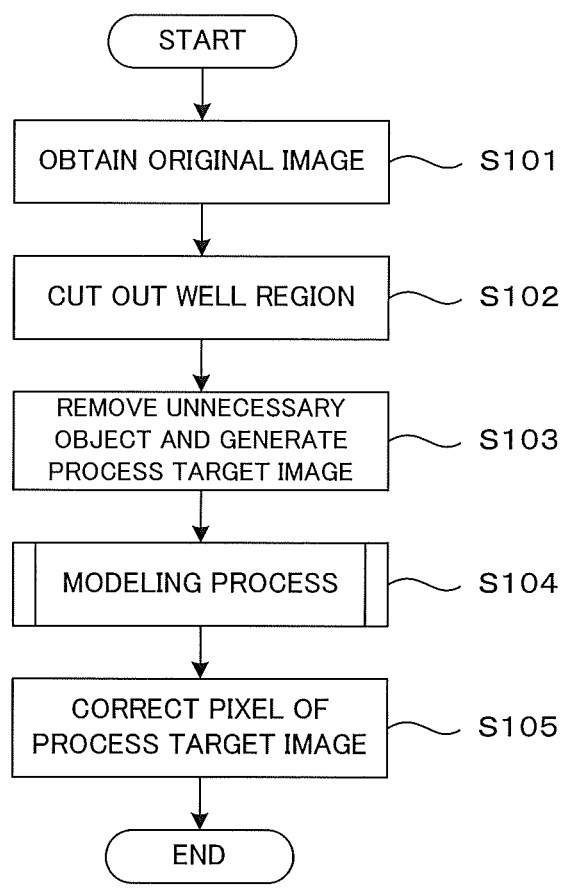
FIG. 4 is a flow chart showing the shading correction process in this embodiment.

FIG. 4 is a flow chart showing the shading correction process in this embodiment. This process is realized by the CPU 141 of the controller 14 executing the control program stored in advance in the memory 145. First, an original image is obtained by imaging the well W provided in the well plate WP together with the contents thereof (Step S101). An image of the well W imaged by the imager 13 can be used as the original image. Besides, it is also possible to use an image given from an external imaging device or data storage device via the interface unit 142. If the obtained image includes a plurality of wells W or includes many margins other than the well W, a rectangular region including one entire well W and a minimum margin of this image is cut out as a well region and the cut-out partial image is set as an original image (Step S102).

If the original image obtained in this way includes unnecessary objects clearly different from the imaging object such as air bubbles and foreign matters in the culture medium M, these are removed by an appropriate image processing. In this way, a process target image serving as a target of the shading correction process in this embodiment is generated (Step S103). In the image processing in this case, known various image processing algorithms called "outlier removing" can be, for example, applied. Further, a process of removing an object designated by a user may be applied. By performing such a process, image quality after the shading correction process can be improved, but there are many cases where an image includes no such unnecessary object. Thus, this process may be omitted.

Further, the original image also includes the cells or the like serving as the imaging objects. Out of those, objects taking up a particularly large area in the well may be removed similarly to the unnecessary objects. However, if the imaging objects are general cells, a density difference from the culture medium M is small. Thus, even if the imaging objects remain as they are, an influence on a processing result is thought to be small. This is because a small density change due to the cells or the like is substantially ignored since the process is performed, regarding the luminance distribution of the background part in the well as the two-dimensional normal distribution in this embodiment as described below.

Subsequently, a modeling process for generating the model image equivalent to the reference image in the conventional shading correction process is performed on the basis of the generated process target image (Step S104). The principle of the modeling process is described below. The modeling process is a process for specifying a mathematical model representing a luminance distribution of a background part (hereinafter, referred to as a "background model"), regarding that the well region corresponding to the well W in the process target image is a region where the cells or the like as the imaging objects are distributed in the background having a predetermined luminance distribution. As described above, in this embodiment, it is assumed that the luminance distribution of the background part follows the two-dimensional normal distribution expressed by (Equation 1). Thus, to specify the background model, the unknown parameters a, b, c, d, e, f and g in (Equation 1) may be determined to fit well to a luminance distribution in the process target image.

Fitting is performed by determining the unknown parameters a, b, c, d, e, f and g to minimize a square error of a luminance value $L(x, y)$ of each pixel $P(x, y)$ of the process target image and a luminance value $F(x, y)$ of a corresponding pixel in the background model. The square error E can be expressed by the following (Equation 2).

$$E = \sum_{i=1}^{n} \{F(x_i, y_i, ; a_0, b_0, c_0, d_0, e_0, f_0, g_0) - \Delta F\}^2 \quad \text{(Equation 2)}$$

where $$\Delta F = \frac{\partial F}{\partial a}\Delta a + \frac{\partial F}{\partial b}\Delta b + \frac{\partial F}{\partial c}\Delta c +$$
$$\frac{\partial F}{\partial d}\Delta d + \frac{\partial F}{\partial e}\Delta e + \frac{\partial F}{\partial f}\Delta f + \frac{\partial F}{\partial g}\Delta g$$

In (Equation 2), a sign i is a suffix for distinguishing the individual pixels constituting the image. The process target image is composed of n pixels and each pixel is distinguished by the suffix i (i=1, 2, . . . , n). Coordinate values of the $i^{th}$ pixel Pi is expressed by $(x_i, y_i)$. Further, signs $a_0$ to $g_0$ denote specific numerical values as initial values of the respective parameters a to g. Further, signs $\Delta a$ to $\Delta g$ represent differences of the respective parameters a to g.

Further, partial differential coefficients included in each term of an equation expressed by a sign $\Delta F$ in (Equation 2) can be respectively expressed as follows from (Equation 1).

$$\left.\begin{aligned}\frac{\partial F}{\partial a} &= \exp(-b(x-e)^2 - c(y-f)^2 + d(x-e)(y-f)) \\ \frac{\partial F}{\partial b} &= -a(x-e)^2 \exp(-b(x-e)^2 - c(y-f)^2 + d(x-e)(y-f)) \\ \frac{\partial F}{\partial c} &= -a(y-f)^2 \exp(-b(x-e)^2 - c(y-f)^2 + d(x-e)(y-f)) \\ \frac{\partial F}{\partial d} &= a(x-e)(y-f)\exp(-b(x-e)^2 - c(y-f)^2 + d(x-e)(y-f)) \\ \frac{\partial F}{\partial e} &= a\{2be(x-e) - d(y-f)\}^2 \exp(-b(x-e)^2 - c(y-f)^2 + d(x-e)(y-f)) \\ \frac{\partial F}{\partial f} &= a\{2cf(y-f) - d(x-e)\}^2 \exp(-b(x-e)^2 - c(y-f)^2 + d(x-e)(y-f))\end{aligned}\right\} \quad \text{(Equation 3)}$$

The following equation is obtained from a condition that the right side of (Equation 2) becomes zero by being partially differentiated by $\Delta a$ to $\Delta g$.

An operant [Q] written in square brackets in (Equation 4) indicates a total value of values of the function Q obtained for all the pixels. Further, signs $\Delta a_0$ to $\Delta g_0$ indicate difference values of the parameters a to g from the respective initial values. Further, on the right side, $$F_i = F(x_i, y_i).$$

Values of partial differential coefficients in (Equation 4) can be obtained as numerical values by substituting the initial values $a_0$ to $g_0$ and the coordinate values $(x_i, y_i)$ of each point into (Equation 3). Note that, in each component of a 7×7 matrix constituting the left side of (Equation 4), a multiplication order of primary differential values is interchangeable. Thus, this matrix is a symmetric matrix.

The background model is determined by solving (Equation 4) and obtaining the parameters a, b, c, d, e, f and g using the initial values $a_0$ to $g_0$ and the difference values $\Delta a_0$ to $\Delta g_0$. In this embodiment, the Levenberg-Marquardt method (hereinafter, abbreviated as the "LM method") is used as a solution of the equation to well match the luminance distribution of the background model particularly in the well peripheral end part with an actual measurement (i.e. a background luminance distribution in the process target image) by reflecting the constraint conditions described above. The LM method is an example of a calculation method for converging an unknown parameter to an optimal (Equation 4)

$$\begin{pmatrix} \left[\left(\frac{\partial F}{\partial a}\right)^2\right] & \left[\frac{\partial F}{\partial a}\frac{\partial F}{\partial b}\right] & \left[\frac{\partial F}{\partial a}\frac{\partial F}{\partial c}\right] & \left[\frac{\partial F}{\partial a}\frac{\partial F}{\partial d}\right] & \left[\frac{\partial F}{\partial a}\frac{\partial F}{\partial e}\right] & \left[\frac{\partial F}{\partial a}\frac{\partial F}{\partial f}\right] & \left[\frac{\partial F}{\partial a}\frac{\partial F}{\partial g}\right] \\ \left[\frac{\partial F}{\partial b}\frac{\partial F}{\partial a}\right] & \left[\left(\frac{\partial F}{\partial b}\right)^2\right] & \left[\frac{\partial F}{\partial b}\frac{\partial F}{\partial c}\right] & \left[\frac{\partial F}{\partial b}\frac{\partial F}{\partial d}\right] & \left[\frac{\partial F}{\partial b}\frac{\partial F}{\partial e}\right] & \left[\frac{\partial F}{\partial b}\frac{\partial F}{\partial f}\right] & \left[\frac{\partial F}{\partial b}\frac{\partial F}{\partial g}\right] \\ \left[\frac{\partial F}{\partial c}\frac{\partial F}{\partial a}\right] & \left[\frac{\partial F}{\partial c}\frac{\partial F}{\partial b}\right] & \left[\left(\frac{\partial F}{\partial c}\right)^2\right] & \left[\frac{\partial F}{\partial c}\frac{\partial F}{\partial d}\right] & \left[\frac{\partial F}{\partial c}\frac{\partial F}{\partial e}\right] & \left[\frac{\partial F}{\partial c}\frac{\partial F}{\partial f}\right] & \left[\frac{\partial F}{\partial c}\frac{\partial F}{\partial g}\right] \\ \left[\frac{\partial F}{\partial d}\frac{\partial F}{\partial a}\right] & \left[\frac{\partial F}{\partial d}\frac{\partial F}{\partial b}\right] & \left[\frac{\partial F}{\partial d}\frac{\partial F}{\partial c}\right] & \left[\left(\frac{\partial F}{\partial d}\right)^2\right] & \left[\frac{\partial F}{\partial d}\frac{\partial F}{\partial e}\right] & \left[\frac{\partial F}{\partial d}\frac{\partial F}{\partial f}\right] & \left[\frac{\partial F}{\partial d}\frac{\partial F}{\partial g}\right] \\ \left[\frac{\partial F}{\partial e}\frac{\partial F}{\partial a}\right] & \left[\frac{\partial F}{\partial e}\frac{\partial F}{\partial b}\right] & \left[\frac{\partial F}{\partial e}\frac{\partial F}{\partial c}\right] & \left[\frac{\partial F}{\partial e}\frac{\partial F}{\partial d}\right] & \left[\left(\frac{\partial F}{\partial e}\right)^2\right] & \left[\frac{\partial F}{\partial e}\frac{\partial F}{\partial f}\right] & \left[\frac{\partial F}{\partial e}\frac{\partial F}{\partial g}\right] \\ \left[\frac{\partial F}{\partial f}\frac{\partial F}{\partial a}\right] & \left[\frac{\partial F}{\partial f}\frac{\partial F}{\partial b}\right] & \left[\frac{\partial F}{\partial f}\frac{\partial F}{\partial c}\right] & \left[\frac{\partial F}{\partial f}\frac{\partial F}{\partial d}\right] & \left[\frac{\partial F}{\partial f}\frac{\partial F}{\partial e}\right] & \left[\left(\frac{\partial F}{\partial f}\right)^2\right] & \left[\frac{\partial F}{\partial f}\frac{\partial F}{\partial g}\right] \\ \left[\frac{\partial F}{\partial g}\frac{\partial F}{\partial a}\right] & \left[\frac{\partial F}{\partial g}\frac{\partial F}{\partial b}\right] & \left[\frac{\partial F}{\partial g}\frac{\partial F}{\partial c}\right] & \left[\frac{\partial F}{\partial g}\frac{\partial F}{\partial d}\right] & \left[\frac{\partial F}{\partial g}\frac{\partial F}{\partial e}\right] & \left[\frac{\partial F}{\partial g}\frac{\partial F}{\partial f}\right] & \left[\left(\frac{\partial F}{\partial g}\right)^2\right] \end{pmatrix} \begin{pmatrix} \Delta a_0 \\ \Delta b_0 \\ \Delta c_0 \\ \Delta d_0 \\ \Delta e_0 \\ \Delta f_0 \\ \Delta g_0 \end{pmatrix} = \begin{pmatrix} \left[\frac{\partial F}{\partial a}F_i\right] \\ \left[\frac{\partial F}{\partial b}F_i\right] \\ \left[\frac{\partial F}{\partial c}F_i\right] \\ \left[\frac{\partial F}{\partial d}F_i\right] \\ \left[\frac{\partial F}{\partial e}F_i\right] \\ \left[\frac{\partial F}{\partial f}F_i\right] \\ \left[\frac{\partial F}{\partial g}F_i\right] \end{pmatrix}$$

value by iteratively calculating for a recurrence formula in which an appropriate initial value is given to the parameter. By setting the initial value reflecting constraint conditions, a convergence result and an actual measurement result can be well matched.

The recurrence formula is expressed by the following (Equation 5) using a suffix K indicating a term number.

$$U^{(K+1)}u^{(K)}-(H_u^{(K)}+hD[H_u^{(K)}])^{-1}\nabla_u J^{(K)} \quad \text{(Equation 5)}$$

In (Equation 5), a symbol Hu represents a 7×7 matrix on the left side of (Equation 4) and a symbol ∇uJ represents a vector on the right side of (Equation 4). Further, a symbol D[Hu] represents a function for taking a diagonal term of the matrix Hu, and a symbol h is a coefficient also called a Marquardt parameter. A specific procedure of the modeling process for specifying the background model of the process target image is described below using (Equation 5).

Figure 5:
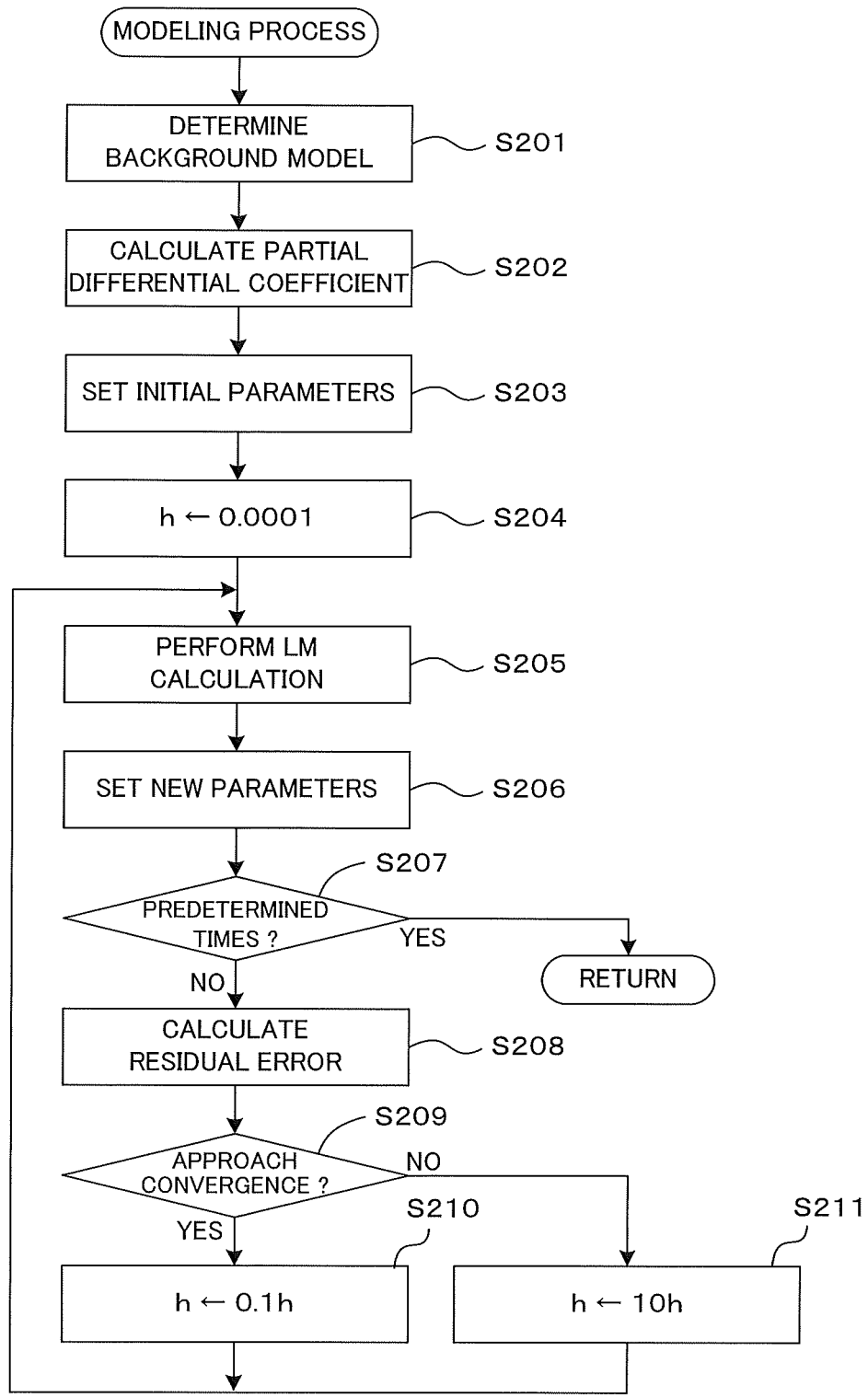
FIG. 5 is a flow chart showing an example of the modeling process.

FIG. 5 is a flow chart showing an example of the modeling process. This process is realized by the CPU 141 of the controller 14 executing the control program stored in advance in the memory 145. First, which mathematical model is used to represent the background model is determined (Step S201). Generally, various mathematical models are conceivable as the background model, but (Equation 1), i.e. the probability density function of the two-dimensional normal distribution is used as the background model in this embodiment as described above. In other words, the process shown in FIG. 5 can be utilized also when the background model is expressed by another mathematical formula.

Then, each partial differential coefficient in the equation expressing the square error of the process target image and the background model is obtained using the equation of the background model (Step S202). In this embodiment, each partial differential coefficient is expressed by (Equation 3). These partial differential coefficients are substituted into (Equation 5).

Subsequently, the initial values of the parameters to be given to the recurrence formula of (Equation 5) are set (Step S203). The initial values of the parameters a, b, c, d, e, f and g are determined as follows on the basis of the luminance value of each pixel constituting the process target image.

FIGS. 6A to 6C are diagrams showing a method for obtaining initial values of the recurrence formula from the process target image. More specifically, FIG. 6A shows an example of the process target image and FIG. 6B is a histogram showing a luminance value distribution of the pixels constituting this image. Further, FIG. 6C is a table showing various pieces of data obtained from the histogram. As shown in FIG. 6A, a case is considered where an image of the well W bright in a central part and dark in a peripheral edge part is a process target image Ip. Here, the image Ip obtained by imaging the well W into which the culture medium M not containing the cells or the like is injected is used. A large defective part seen in a left upper part of the well W is caused by air bubbles generated on the liquid surface.

As shown in FIG. 6B, when a distribution of luminance values in the respective pixels constituting a circular part corresponding to the well W, out of the process target image Ip, is expressed by a histogram, a peak corresponding to a low luminance part of the peripheral edge part of the well W appears at a relatively low luminance and the luminance values of the respective pixel in the well W are widely distributed on a side higher than this peak. This indicates that brightness unevenness is large in the well W. From this histogram, each piece of data shown in FIG. 6C is obtained. Out of these, a value 29 of a mode is set as an initial value of the parameter g corresponding to the luminance to which the base part of the curved surface of FIG. 3A comes closer. Further, a value 138 obtained by subtracting the mode from a maximum value is set as an initial value of the parameter a corresponding to a peak height of the curved surface of FIG. 3A.

The other parameters relate to an elliptical shape represented by cross-sections when the curved surface of FIG. 3A are cut by planes parallel to the XY plane. To obtain initial values of these, the process target image Ip is binarized using an appropriate threshold value and an elliptical area is extracted. Here, a half value in the two-dimensional normal distribution represented by the curved surface of FIG. 3A, i.e. a value equivalent to a middle point between the initial values of the parameters a, g set in advance (=(a−g)/2), is used as the threshold value.

Figures 7A, 7B:
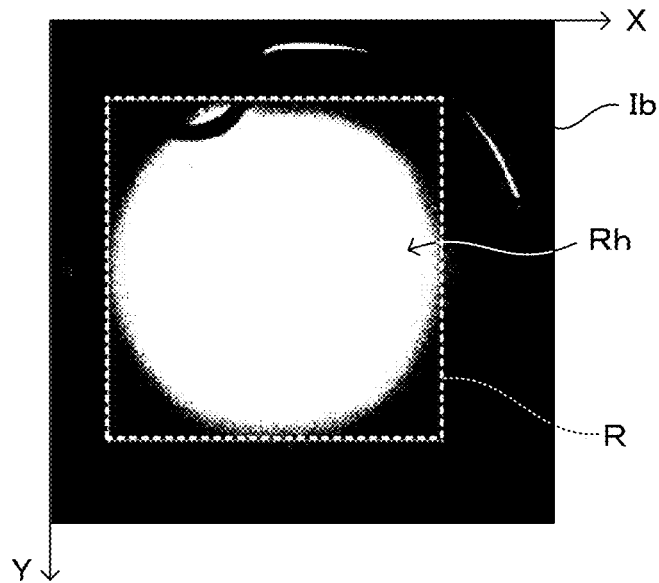
FIGS. 7A and 7B are diagrams showing an example of a binarized image.

FIGS. 7A and 7B are diagrams showing an example of a binarized image. More specifically, FIG. 7A shows an example of a binarized image Ib obtained from the image of FIG. 6A and FIG. 7B is a table showing various pieces of data obtained from this binarized image Ib. As shown in FIG. 7A, in the binarized image Ib generated from the process target image Ip, a region having a luminance value equal to or larger than the threshold value, out of the process target image Ip, is extracted. Thus, a high-luminance part in a central part is mainly extracted and the shape of the thus extracted region represents a schematic shape of the elliptical region described above. Thus, the initial values of the remaining parameters can be obtained from the shape of the extracted high-luminance region.

Note that there is not necessarily a single high-luminance region extracted by binarization due to brightness unevenness appearing in the image. Accordingly, if there are a plurality of extracted high-luminance regions, attention is paid to the one having a largest area out of those. Further, if it is clear in appearance that a plurality of separated high-luminance regions form one continuous region as a whole, for example, as in an air bubble part shown in a left upper part of FIG. 7A, those high-luminance regions may be regarded as one high-luminance region.

A dotted line of FIG. 7A represents a rectangle (circumscribing rectangle) R circumscribing a high-luminance region Rh extracted by binarization, and FIG. 7B shows vertex coordinate positions and size of this circumscribing rectangle R. A width, i.e. a length in the X direction, of the circumscribing rectangle R is 450 and this is set as the initial value of the parameter b. On the other hand, a height, i.e. a length in the Y direction, of the circumscribing rectangle R is 462 and this is set as the initial value of the parameter c. Further, an X coordinate value of a centroid position of the circumscribing rectangle R is 301, a Y coordinate value thereof is 335 and these are respectively set as the initial values of the parameters e, f. The initial value of the parameter d relating to the rotation of the elliptical region is set to 0.

The initial values of the respective parameters are organized as follows.

a: 138 (difference between the maximum value and the mode in the histogram)

b: 450 (width of the circumscribing rectangle in the binarized image)

c: 462 (height of the circumscribing rectangle in the binarized image)

d: 0 (no rotation is assumed)

e: 301 (X coordinate of the centroid of the circumscribing rectangle in the binarized image)

f: 335 (Y coordinate of the centroid of the circumscribing rectangle in the binarized image)

g: 29 (mode)

Using a set (a, b, c, d, e, f, g) of the parameters having these as the initial values, a coefficient h is set to an appropriate value, e.g. 0.0001 (Step S204) and the calculation by the LM method is performed to solve (Equation 5) (Step S205), whereby the difference values $\Delta a_0$, $\Delta b_0$, $\Delta c_0$, $\Delta d_0$, $\Delta e_0$, $\Delta f_0$ and $\Delta g_0$ are respectively obtained.

By adding or subtracting the obtained difference values $\Delta a_0$, $\Delta b_0$, $\Delta c_0$, $\Delta d_0$, $\Delta e_0$, $\Delta f_0$ and $\Delta g_0$ to or from the currently set values of the parameters a, b, c, d, e, f and g, a new parameter set (a, b, c, d, e, f, g) is generated (Step S206). If an execution number of the iterative calculation by the LM method has reached a predetermined value (YES in Step S207), the process is finished.

Unless the execution number of the iterative calculation by the LM method has reached the predetermined value (NO in Step S207), a difference between a value $u^{(K)}$ of the current recurrence formula and a newly calculated value $u^{(K+1)}$ is calculated as a residual error (Step S208). If the residual error is smaller than a value obtained in the last calculation, the equation is judged to approach convergence (YES in Step S209). In this case, to avoid large variations of the parameters by one calculation, the coefficient h is reduced to 1/10 of the current value (Step S210). On the other hand, if the residual error is larger than the value obtained in the last calculation, the equation is judged to move away from convergence (NO in Step S209) and the coefficient h is increased to ten-fold of the current value.

By performing the iterative calculation using the LM method in this way, the parameter set (a, b, c, d, e, f, g) is optimized. As a result, the background model expressed by (Equation 1) having these parameters substituted thereinto is optimized according to the luminance distribution in the actually obtained process target image. The background model generated by the modeling process described above is regarded as the virtual reference image. By correcting the luminance values of the respective pixels constituting the process target image using the luminance values of the pixels of the model image, a corrected image having the shading correction process applied thereto is obtained.

Referring back to FIG. 4, the shading correction process is further described. When the modeling process is finished, the luminance value of each pixel of the process target image is corrected on the basis of the background model (Step S105). More specifically, the model image having the luminance profile possessed by the background model expressed by (Equation 1) and the optimized parameter set (a, b, c, d, e, f, g) is virtually generated. Each pixel constituting the model image has a value of F(x, y) obtained by substituting the coordinate position (x, y) thereof into optimized (Equation 1) as the luminance value. By performing the shading correction process regarding this model image as the reference image, the corrected image having brightness unevenness in the process target image solved is generated.

The correction process in this case can be performed on the basis of a principle similar to that of the known shading correction process and can be performed, for example, as follows. Specifically, it is assumed that L1 denotes a luminance value of an arbitrary target pixel in the process target image and L2 denotes a luminance value of a pixel located at a coordinate position corresponding to the coordinate position of the target pixel in the model image expressed by the optimized background model. At this time, a luminance value L3 of the pixel occupying this coordinate position in the corrected image is obtained by the following equation:

$$L3 = A \cdot (L1/L2) + B \quad \text{(Equation 6)},$$

whereby the luminance value of the pixel after correction is determined.

Symbols A, B in (Equation 6) are actual constants appropriately determined in advance and, out of these, the constant A is not 0. By arranging each pixel having the luminance value obtained in this way at the predetermined coordinate position, the corrected image having brightness unevenness in the original image solved is obtained.

Note that the process target image serving as a target of correction in this process has the unnecessary objects in the well removed in Step S103. The image having clearly unnecessarily objects such as air bubbles and foreign matters removed can be directly used as a target of the correction process. On the other hand, only for the purpose of simply generating a background model, the modeling process can be performed, using an image having objects corresponding to the cells or the like in the well as the original imaging objects at least partially removed, an image having a filtering process for smoothing an image density change applied thereto or the like as the process target image.

In such a case, since part of image information relating to the imaging object may be lost, it is not appropriate to use the image used in the modeling process as the target of the correction process. Thus, it is desirable to directly use the original image obtained in Step S101 or S102 as the target of the correction process or to separately prepare an image having only clearly unnecessary objects removed therefrom as the process target image and use this image for the correction process.

Figure 8A:
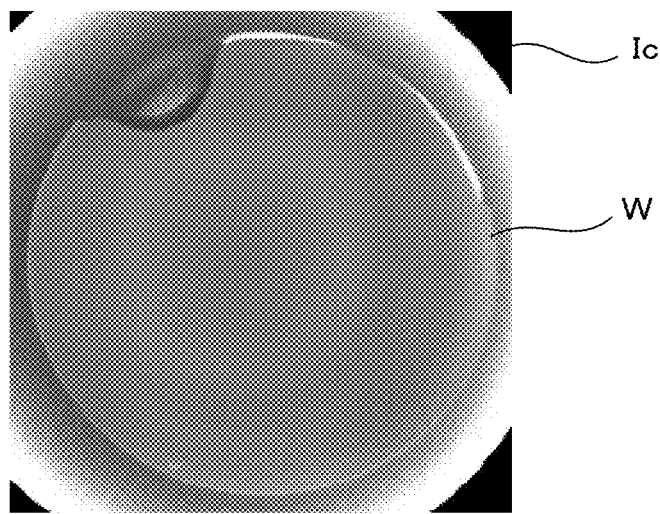
FIGS. 8A and 8B are diagrams showing an example of a corrected image.
Figure 8B:
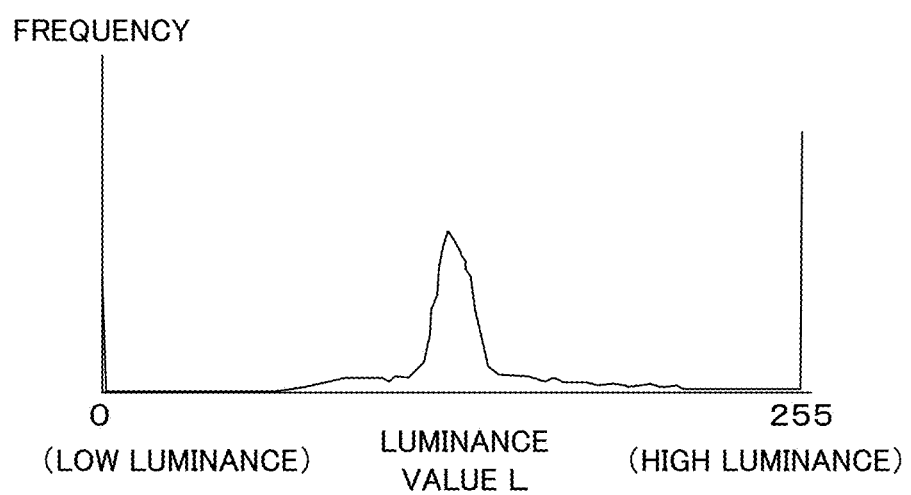

FIGS. 8A and 8B are diagrams showing an example of a corrected image. More specifically, FIG. 8A shows an example of a corrected image Ic obtained by correcting the process target image shown in FIG. 6A by the shading correction process of this embodiment. Further, FIG. 8B is a histogram showing a distribution of luminance values of pixels constituting this image Ic. In comparison to the process target image Ip shown in FIG. 6A, the inside of the well W is entirely brighter in the corrected image Ic shown in FIG. 8A and a difference in brightness between the central part and the peripheral edge part of the well is smaller. As shown in FIG. 8B, it is understood that a variation of the luminance values of the respective pixels becomes smaller, brightness unevenness is solved and the brightness of the image is uniformized.

By performing the above process on the image including the cells or the like as the imaging objects, an image in a state where the cells or the like are distributed in the well region having the background substantially uniformized is obtained as the corrected image. In this way, it is possible to generate an image having an imaging object clarified by correcting brightness unevenness even from an original image having nonuniform illumination conditions in the well W, for example, due to the meniscus of the liquid surface.

As described above, in the above embodiment, Steps S101, S103, S104 and S105 of FIG. 4 respectively correspond to an "image obtaining step", an "object removal step", "an approximation step" and a "correction step" of the invention.

Further, in the above embodiment, the well plate WP corresponds to a "specimen container", and each well W corresponds to a "recess" of the invention. Further, the X coordinate axis and the Y coordinate axis in the imaged image respectively correspond to a "first coordinate axis" and a "second coordinate axis" of the invention. Further, the high-luminance region Rh in the binarized image Ib of FIG. 7A corresponds to a "main region" of the invention.

Note that the invention is not limited to the above embodiment and various changes other than those described above can be made without departing from the gist of the invention. For example, a function of correcting the original image using the background model generated on the basis of the information obtained from the original image is provided in the above embodiment. However, a function of generating the background model and a function of performing a correction on the basis of the background model may be separated. For example, the invention can be applied also to an apparatus having only a function of supplying data necessary for correction to an external apparatus or the like in charge of a shading correction function.

In this case, the data relating to the background model, e.g. (Equation 1) or the image data corresponding to the virtual model image represented by the background model corresponds to "shading reference data" of the invention. Then, this apparatus serves as a main body implementing the "shading reference data generation method" according to the invention. In such a mode, Step S104 corresponds to a "setting step" of the invention.

Further, in the above embodiment, one entire well W is imaged by one imaging. On the other hand, in the case of imaging wells (e.g. about 6 to 48 wells arranged in one well plate) or dishes having a larger diameter, a range to be imaged may become larger than a visual field of the imager 13. In this case, the range to be imaged is imaged by being divided into a plurality of partial images and those partial images are combined by an image processing to generate an image covering the entire range to be imaged. Even in such a case, the correction process according to the invention can be applied to the individual partial images. By combining the corrected partial images, it is possible to obtain an image with less brightness unevenness in its entirety.

Further, the above embodiment relates to the apparatus with the imaging function of imaging the original image. However, the "image processing method" and the "shading reference data generation method" of the invention can also be realized by an apparatus having no imaging function itself and configured to perform a process on the basis of original image data given from an external apparatus or the like.

Further, in the modeling process of the above embodiment, it is assumed that the background model is expressed by the probability density function of the two-dimensional normal distribution. However, the modeling process itself shown in FIG. 5 can be similarly applied to a background model expressed by an arbitrary mathematical expression. For example, it is possible to prepare a plurality of background models including the two-dimensional normal distribution model in advance and select any one of the background models in Step S201.

Further, in the correction process (Step S105 of FIG. 4) of the above embodiment, the model image is generated from the background model expressed by (Equation 1) with the optimized parameters. However, it is sufficient to provide information necessary to correct the luminance value to each pixel of the process target image and it is not always necessary to generate the image data of the virtual model image. For example, the coordinate value may be substituted into (Equation 1) for each target pixel and the luminance value of this pixel in the model image may be calculated every time. Further, the value obtained by substituting the coordinate value into optimized (Equation 1) corresponds to L2 of (Equation 6). Accordingly, a pixel value after correction may be directly calculated from the luminance value and the coordinate value of the target pixel, using a calculation formula obtained, for example, by substituting the right side of (Equation 1) into L2 of (Equation 6).

Further, in the above embodiment, the luminance value after correction of each pixel is calculated using (Equation 6). However, this method is merely an example and specific contents of the correction process after the background model is specified are not limited to the above, but arbitrary.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

INDUSTRIAL APPLICABILITY

The invention is suitable in technical fields requiring brightness unevenness in an image obtained by imaging, particularly an image obtained by imaging an imaging object together with a substantially uniform background to be solved.

REFERENCE SIGNS LIST 1 imaging apparatus
12 illuminator
13 imager
14 controller
Rh high-luminance region (main region)
S101 image obtaining step
S103 object removal step
S104 approximation step, setting step
S105 correction step
W well (recess)
WP well plate (specimen container)

The invention claimed is:
1. An image processing method, comprising:
an image obtaining step of obtaining an original image obtained by imaging an imaging object together with a substantially uniform background;
an approximation step of specifying an approximation formula for approximating a two-dimensional luminance profile of the original image to a probability density function of a two-dimensional normal distribution; and
a correction step of correcting a luminance value of each pixel constituting the original image on the basis of a luminance value of the two-dimensional luminance profile expressed by the approximation formula,
wherein, in the approximation step, the approximation formula is specified by obtaining unknown parameters a, b, c, d, e, f and g using the following equation:

$$F(x,y)=a\cdot\exp\{-b(x-e)^2+c(y-f)^2+d(x-e)(y-f)\}+g$$

as the approximation formula when x denotes a coordinate on a first coordinate axis of the original image and y denotes a coordinate on a second coordinate axis orthogonal to the first coordinate axis,
wherein the approximation formula is specified by the Levenberg-Marquardt method in the approximation step, wherein a maximum value, a minimum value and a mode in a luminance value histogram of the original image are obtained in the approximation step; and wherein when the original image is binarized using a half value of a difference between the maximum value and the mode as a threshold value and a region having a largest area, out of regions in which pixels having a luminance value equal to or larger than the threshold value continue, is set as a main region, initial values of the respective unknown parameters are set as follows:

a: the difference between the maximum value and the mode,
b: a length of the main region in a direction of the first coordinate axis,
c: a length of the main region in a direction of the second coordinate axis,
d: 0,
e: a coordinate value of a centroid of the main region on the first coordinate axis,
f: a coordinate value of the centroid of the main region on the second coordinate axis, and
g: the mode.

2. The image processing method according to claim 1, wherein, in the correction step, when L1 denotes the luminance value of each pixel of the original image and L2 denotes a luminance value of a corresponding pixel in the two-dimensional luminance profile expressed by the approximation formula, a luminance value L3 of the pixel after correction is obtained by the following equation:

$$L3 = A \cdot (L1/L2) + B$$

using actual constants A (A≠0) and B determined in advance.

3. The image processing method according to claim 1, further comprising an object removal step of removing at least one of one or more objects included in the original image from the original image prior to the approximation step.

* * * * *